Figure 1:
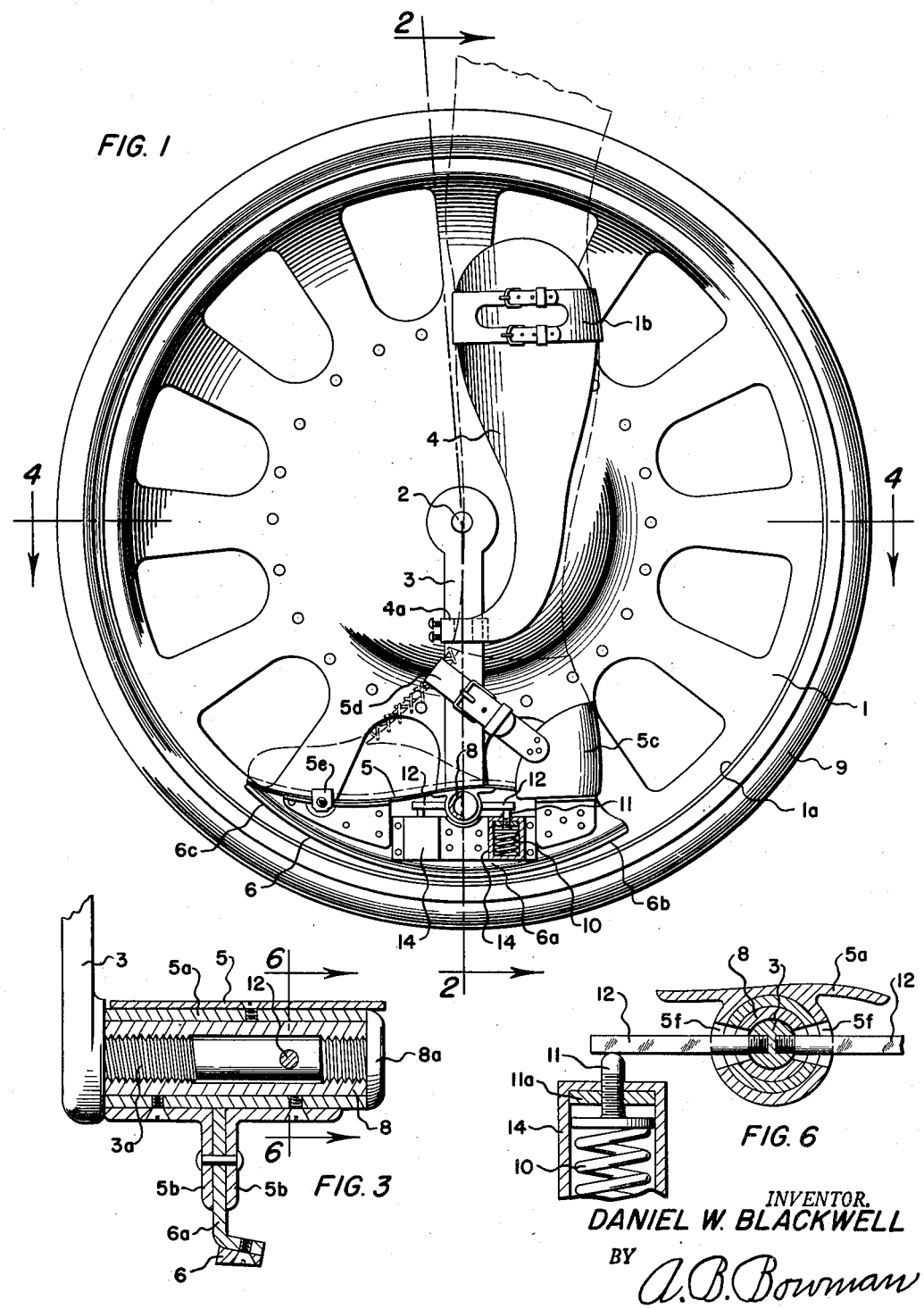

Aug. 29, 1950   D. W. BLACKWELL   2,520,793
WHEEL FOR FOOT ATTACHMENTS
Filed Oct. 21, 1946   2 Sheets-Sheet 1

INVENTOR.
DANIEL W. BLACKWELL
BY A. B. Bowman
ATTORNEY

Aug. 29, 1950   D. W. BLACKWELL   2,520,793
WHEEL FOR FOOT ATTACHMENTS
Filed Oct. 21, 1946   2 Sheets-Sheet 2
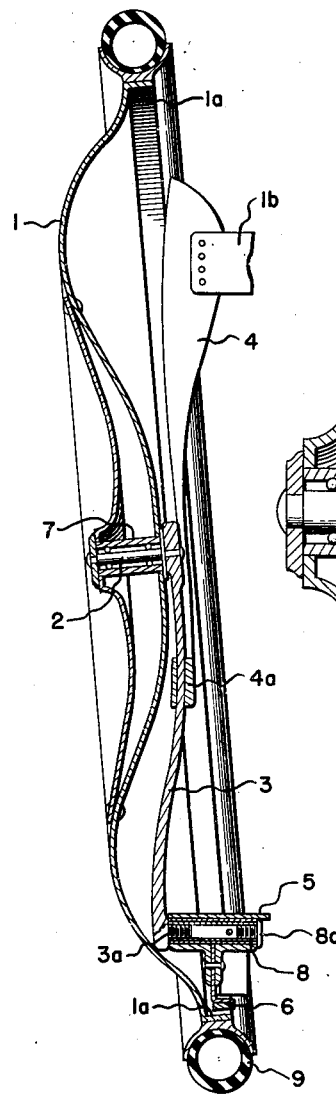
FIG. 2
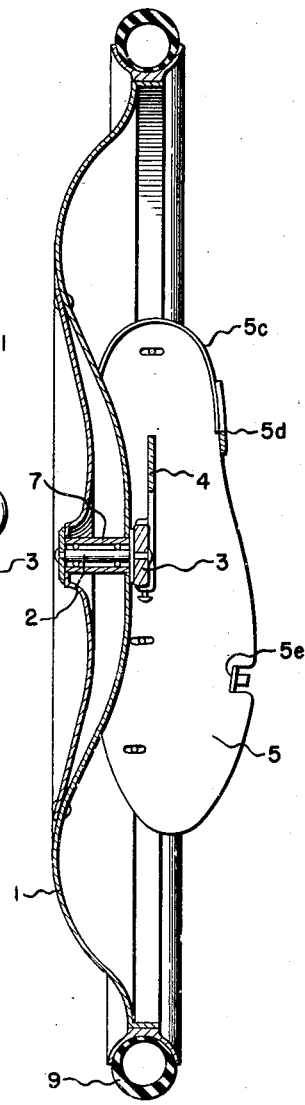
FIG. 5
FIG. 4
INVENTOR.
DANIEL W. BLACKWELL
BY
A.B.Bowman
ATTORNEY Patented Aug. 29, 1950

2,520,793

UNITED STATES PATENT OFFICE 2,520,793

WHEEL FOR FOOT ATTACHMENT

Daniel W. Blackwell, San Diego, Calif.

Application October 21, 1946, Serial No. 704,578

2 Claims. (Cl. 280—11.24)

My invention relates to a vehicle more particularly for use in connection with the feet of a person and the objects of my invention are:

First, to provide a vehicle of this class which may be entirely operated in connection with the feet of a person;

Second, to provide a vehicle of this class in which relatively large diameter wheels are provided with foot rest members suspended below the axis of said wheels providing relatively smooth operation of said vehicle over uneven surfaces;

Third, to provide a vehicle of this class in which frictional engagement for motivation or braking may be accomplished by tilting the feet of the person riding my vehicle;

Fourth, to provide a vehicle of this class which is motivated in connection with the person's feet simulating the normal walking motion of the person riding my vehicle;

Fifth, to provide a vehicle of this class in which a person's feet in connection therewith, are afforded positive forward traction and positive braking operation relatively to the surface on which the vehicle is being operated; and Sixth, to provide a vehicle of this class which is very simple and economical of construction, efficient in operation, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a side elevational view of my vehicle showing by dash lines the relative position of a person's leg and foot in connection therewith; Fig. 2 is a vertical sectional view thereof taken from the line 2—2 of Fig. 1; Fig. 3 is an enlarged fragmentary sectional view taken on the same plane as that shown in Fig. 2 of the drawings; Fig. 4 is a plan sectional view of my vehicle taken from the line 4—4 of Fig. 1; Fig. 5 is an enlarged fragmentary sectional view taken on the same plane as that shown in Fig. 2 of the drawings; and Fig. 6 is an enlarged fragmentary sectional view taken from the line 6—6 of Fig. 3.

Similar characters of reference refer to similar parts and portions throughout the several views of the drawings.

The wheel 1, axle 2, suspension arm 3, leg brace 4, foot plate 5, friction shoe 6, bushings 7 and 8, and the tire 9, constitute the principal parts and portions of my vehicle.

The wheel 1 as shown best in Figs. 1 and 2 of the drawings is provided with a resilient tire 9 positioned about its periphery and an internal drum surface 1a engageable with the friction shoe 6, pivotally mounted about the axis of the bushing 8 as shown best in Fig. 1 of the drawings. The wheel 1 is journaled on the axle 2 in the bushing 7 and is provided with bearings 2a as shown best in Fig. 5 of the drawings. Secured on one end of the axle 2 is the suspension arm 3. This suspension arm 3 as shown best in Figs. 2 and 3 of the drawings is provided with a trunion portion 3a at its lower end in connection with which is screw-threaded the bushing 8. Screw threaded in the opposite end of this bushing 8 is a cap 8a adapted to retain the bearing 5a of the foot plate 5 in position on the bushing 8. The bearing 5a is provided with bracket portions 5b at its lowermost side which support the friction shoe 6 in connection with the supporting plate 6a in connection therewith. The foot plate 5 is provided with a heel supporting portion 5c and ankle strap 5d together with sole clamps 5e for maintaining the shoe on a person's foot in connection with the foot plate 5. It will be noted that the bearing 5a in connection with the foot plate 5 is pivotally mounted on the bushing 8 in connection with the suspension arm 3. The friction shoe 6 is an arcuate shoe as shown best in Figs. 1 and 3 of the drawings arranged to engage the annular drum surface 1a of the wheel 1 when pivoted over the axis of the bushing 8. The leg brace 4 as shown in Figs. 1 and 2 of the drawings is provided with calf engaging strap portions 1b at its upper end and a clamp portion 4a at its lower end vertically adjustably mounted on the suspension arm 3 arranged to accommodate the variety in length of different persons' legs.

The operation of my vehicle is substantially as follows: The person operating my vehicle secures one of said vehicles to each leg by placing his feet in connection with the foot plate 5 as shown in Fig. 1 of the drawings and securing the straps 1b and 5d in place together with the adjustment of the shoe sole clamps 5e. When one of my vehicles is secured to each foot of a person, the person propels himself in substantially the normal walking motion whereby tilting of the foot plate 5 over the axis of the bushing 8 causes the toe portion 6c of the friction shoe 6 to engage the annular drum 1a of the wheel 1 creating positive friction of the person's foot in connection with the ground engaged by the tire 9 of the wheel 1 permitting the operator to take positive forward stride. The wheel 1 is provided with an annular recess adjacent to the foot plate 5, permitting the wheel to be placed closer to the wearer's foot. When in motion, the operator may coast on the wheels 1 by assuming the solid line position as shown in Fig. 1 of the drawings, wherein the friction shoe is disengaged from the drum 1a. When braking the wheel 1 to a stop, the heel portion 6b of the friction shoe 6 is pivoted over the axis of the bushing 8 into engagement of the drum 1a, whereupon resistance to the rotation of the wheel 1 is created bringing the same to a stop in proportion to the amount of pressure applied by the operator. In adjusting the leg brace 4 to fit various people, the clamp portion 4a may be moved up or down the suspension arm 3 and fixed in place thereon, as desired, whereby the strap 1b may be located at the calf of persons' legs having different dimensions. It will be here noted that the foot plate 5 is maintained in substantially level position by the springs 10, engaging plungers 11 bearing against arms 12 screw-threaded in the shaft 3a pivotally mounted in each of the brackets 5a. It will be noted that each of the plungers 11 is provided with a nut 11a screw-threaded thereon, for adjusting tension of the springs 10 in the casings 14 secured to the plate 6a of the friction shoe 6. The adjusting nuts 11a bear against the partially enclosed ends of the spring casings 14, maintaining the plungers 11 in adjustment. When the foot plate 5 is pivoted relatively to the arm 3, one of the plungers 11 is forced upwardly against one of the arms 12, compressing one of the springs 10 which tends to return the foot plate 5 to the neutral position as shown in Fig. 1 of the drawing. It will be noted that the bracket 5a of the foot plate 5 is provided with slotted portions 5f adapted to accommodate a relative movement of the arms 12, therein. As shown in Fig. 1 of the drawings, the springs 10 in the spring casings 14, are positioned in opposite relation to each other over the axis of the bushing 8 providing tension resisting either directional tilting of the foot plate 5, tending to maintain the same in neutral position when the operator of my skate is coasting.

Though I have shown and described the particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a vehicle of the class described the combination of a wheel, an axle for said wheel, a suspension arm in connection with said axle at one side of said wheel, a foot plate at the lower end of said suspension arm, said wheel provided with an annular drum surface outwardly of said foot plate and a friction shoe on said foot plate engageable with said annular drum, said foot plate pivotally mounted in connection with said suspension arm, and springs at opposite sides of the pivotal axis of said foot plate tending to hold the same in neutral position.

2. In a vehicle of the class described the combination of a wheel, an axle for said wheel, a suspension arm in connection with said axle at one side of said wheel, a foot plate at the lower end of said suspension arm, said wheel provided with an annular drum surface outwardly of said foot plate and a friction shoe on said foot plate engageable with said annular drum, said foot plate pivotally mounted in connection with said suspension arm, springs at opposite sides of the pivotal axis of said foot plate tending to hold the same in neutral position, and adjustable plungers engaging said springs arranged to maintain a certain tension, thereof, with respect to said foot plate.

DANIEL W. BLACKWELL.

REFERENCES CITED

The following references are of record in the file of this patent:

UNITED STATES PATENTS

| Number | Name | Date |
|---|---|---|
| 363,716 | Yost | May 24, 1887 |
| 1,023,882 | Schiesari | Apr. 23, 1912 |

FOREIGN PATENTS

| Number | Country | Date |
|---|---|---|
| 577,198 | France | May 30, 1924 |